United States Patent
Thurber et al.

(10) Patent No.: US 9,829,711 B2
(45) Date of Patent: Nov. 28, 2017

(54) INFLATABLE VIRTUAL REALITY HEADSET SYSTEM

(71) Applicant: Ion Virtual Technology Corporation, Boise, ID (US)

(72) Inventors: Daniel Thurber, Boise, ID (US); Michael Cornett, Hazle Township, PA (US)

( * ) Notice: Subject to any disclaimer, the term of this patent is extended or adjusted under 35 U.S.C. 154(b) by 123 days.

(21) Appl. No.: 14/973,109

(22) Filed: Dec. 17, 2015

(65) Prior Publication Data

US 2016/0178911 A1    Jun. 23, 2016

Related U.S. Application Data

(60) Provisional application No. 62/093,549, filed on Dec. 18, 2014.

(51) Int. Cl.
  *G02B 27/14* (2006.01)
  *G02B 27/01* (2006.01)

(52) U.S. Cl.
  CPC ..... *G02B 27/0176* (2013.01); *G02B 27/0101* (2013.01); *G02B 2027/014* (2013.01);
  (Continued)

(58) Field of Classification Search
  CPC ........ G02B 2027/014; G02B 2027/015; G02B 2027/0152; G02B 2027/0169; G02B 2027/0198; G02B 27/0101; G02B 27/0176
  See application file for complete search history.

(56) References Cited

U.S. PATENT DOCUMENTS

| 5,003,300 A | 3/1991 | Wells |
| 5,422,684 A | 6/1995 | Keller |

(Continued)

FOREIGN PATENT DOCUMENTS

| EP | 2765777 | 8/2014 |
| JP | 08125948 | 5/1996 |

(Continued)

OTHER PUBLICATIONS

Korean Intellectual Property Office, International Search Report and Written Opinion of the International Search Authority for PCT/US2015/061513, dated Mar. 3, 2016.

(Continued)

*Primary Examiner* — Thomas K Pham
*Assistant Examiner* — Vipin Patel
(74) *Attorney, Agent, or Firm* — Whitley LegaL Group PC; AnnMarie W. Whitley

(57) ABSTRACT

An inflatable headset system for virtual and augmented reality applications includes multiple inflatable segments that can be inflated or deflated with one or more valves. One inflatable segment either houses a dedicated display device or defines a receptacle for a mobile device. Another inflatable segment includes one or more lenses that are positioned to cooperate with the display of the display device or mobile device when the inflatable segments are at least partially inflated. Preferably, at least one of the inflatable segments has a shape that, when at least partially inflated, acts as a headset frame. The system may further include optional fasteners or straps, optional computer components, optional sensors, and optional input/output devices.

10 Claims, 2 Drawing Sheets

(52) U.S. Cl.
CPC ............... *G02B 2027/015* (2013.01); *G02B 2027/0152* (2013.01); *G02B 2027/0169* (2013.01); *G02B 2027/0198* (2013.01)

(56) References Cited

U.S. PATENT DOCUMENTS

| | | | |
|---|---|---|---|
| 6,160,666 | A | 12/2000 | Makriyannis et al. |
| 6,318,013 | B1 * | 11/2001 | Cope .................. A47F 3/14 40/214 |
| 6,388,797 | B1 | 5/2002 | Lipton et al. |
| 6,963,379 | B2 | 11/2005 | Tomono |
| 8,333,417 | B2 | 12/2012 | Bannasch et al. |
| 8,599,248 | B2 | 12/2013 | Kim et al. |
| 8,605,008 | B1 | 12/2013 | Prest et al. |
| 8,711,462 | B1 | 4/2014 | Kaiser et al. |
| 8,848,006 | B2 | 9/2014 | Wetzstein et al. |
| 8,924,985 | B2 | 12/2014 | Yoo et al. |
| 8,937,592 | B2 | 1/2015 | Marti et al. |
| 8,941,787 | B2 | 1/2015 | Lee et al. |
| 8,957,835 | B2 | 2/2015 | Hoellwarth |
| 2001/0038361 | A1 | 11/2001 | Tanijiri et al. |
| 2002/0163486 | A1 | 11/2002 | Ronzani et al. |
| 2009/0027616 | A1 | 1/2009 | Sheldon |
| 2010/0007935 | A1 | 4/2010 | Hoellwarth |
| 2010/0079356 | A1 * | 4/2010 | Hoellwarth .......... G02B 27/017 345/8 |
| 2010/0277575 | A1 | 11/2010 | Ismael et al. |
| 2011/0051074 | A1 | 3/2011 | Arnell |
| 2011/0199470 | A1 | 8/2011 | Moller et al. |
| 2011/0123774 | A1 | 9/2011 | Satoh et al. |
| 2011/0292191 | A1 | 12/2011 | MacNaughton et al. |
| 2012/0127284 | A1 | 5/2012 | Bar-Zeev et al. |
| 2013/0076998 | A1 | 3/2013 | Kakinuma et al. |
| 2013/0120706 | A1 | 5/2013 | Kakinuma et al. |
| 2013/0300766 | A1 | 11/2013 | Mukawa |
| 2013/0308250 | A1 * | 11/2013 | Chiu .................. G09F 27/00 361/679.01 |
| 2014/0111610 | A1 | 4/2014 | Ha et al. |
| 2014/0375679 | A1 | 12/2014 | Margolis et al. |
| 2001/5003588 | | 2/2015 | Heide et al. |
| 2015/0253574 | A1 | 9/2015 | Thurber |
| 2015/0348327 | A1 | 12/2015 | Zalewski |
| 2016/0011422 | A1 | 1/2016 | Thurber et al. |
| 2016/0011423 | A1 | 1/2016 | Thurber et al. |
| 2016/0011424 | A1 | 1/2016 | Thurber et al. |
| 2016/0011425 | A1 | 1/2016 | Thurber et al. |
| 2016/0019720 | A1 | 1/2016 | Thurber et al. |

FOREIGN PATENT DOCUMENTS

| | | |
|---|---|---|
| JP | 2004029768 | 1/2004 |
| JP | 5030595 | 9/2012 |
| JP | 2013033172 | 2/2013 |
| JP | 2014010326 | 1/2014 |
| KR | 1020000050024 | 8/2000 |
| KR | 1020050048263 | 5/2005 |

OTHER PUBLICATIONS

Korean Intellectual Property Office, International Search Report and Written Opinion of the International Search Authority for PCT/US2015/019340, dated May 29, 2015.

Korean Intellectual Property Office, International Search Report and Written Opinion of the International Search Authority for PCT/US2015/040402, dated Oct. 30, 2015.

Parnes, Peter, Head Mounted Display and PDA, http://www.parnes.com/blog/2003/03/head-mounted-display-and-pda.html, Mar. 23, 2003.

Pak, Jae, Entry 11, The Gadgeteer "Only in Your Dreams" PDA Contest, http://static.the-gadgeteer.com/dreampda-contest-entries.html, May 2001.

Blass, Evan, Engadget.com; http://www.engadget.com/2005/09/15/metal-gear-acid-2-for-psp-to-ship-with-solid-eye-gaming/, Sep. 15, 2005.

Korean Intellectual Property Office, International Search Report and Written Opinion of the International Search Authority for PCT/US2015/066410, dated Apr. 8, 2016.

* cited by examiner

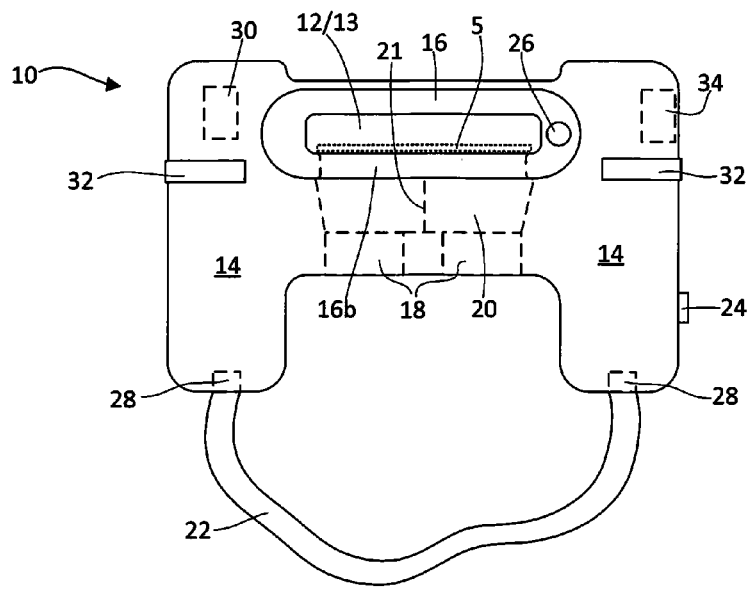
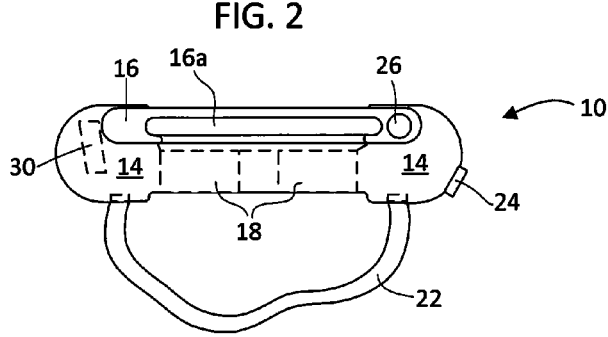
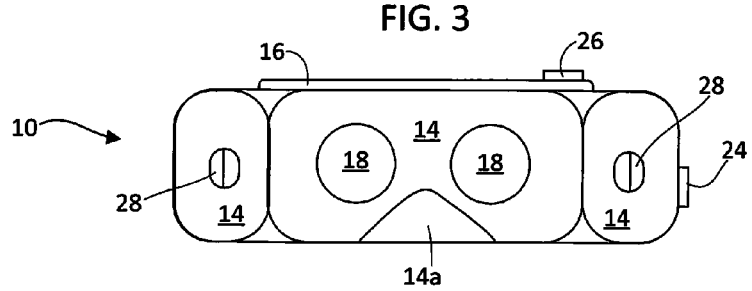

008047
INFLATABLE VIRTUAL REALITY HEADSET SYSTEM

CROSS-REFERENCE TO RELATED APPLICATIONS

This application claims the benefit of provisional U.S. Application No. 62/093,549 filed Dec. 18, 2014.

FIELD OF INVENTION

This invention relates to virtual and augmented reality environments and head mounted displays. More particularly, this device relates to an inflatable virtual or augmented reality headset system.

BACKGROUND

Virtual reality (VR) and augmented reality (AR) systems are gaining in popularity and proving useful for many applications including gaming, entertainment, advertising, architecture and design, medical, sports, aviation, tactical, engineering, and military applications. Most VR or AR systems use personal computers with powerful graphics cards to run software and display the graphics necessary for enjoying an advanced virtual environment. To display virtual reality environments, many systems use head-mounted displays (HMDs).

Many HMDs include two displays, one for each eye, to create a stereoscopic effect and give the illusion of depth. HMDs also can include on-board processing and operating systems such as Android to allow application to run locally, which eliminates any need for physical tethering to an external device. Sophisticated HMDs incorporate positioning systems that track the user's head position and angle to allow a user to virtually look around a VR or AR environment simply by moving his head. Sophisticated HMDs may also track eye movement and hand movement to bring additional details to attention and allow natural interactions with the VR or AR environment.

While traditional HMDs include dedicated components, interest is growing to develop a universal HMD that incorporates a user's own mobile device such as smart phones, tablets, and other portable or mobile devices having video displays. Moreover, interest is growing to develop a universal HMD that can be produced inexpensively, is minimal in size, and can be distributed widely as a promotional item. Currently available HMDs that cooperate with a mobile device fail to accommodate a wide variety of mobile devices and are too expensive and too large to be distributed widely as a promotional item. Accordingly, it would be desirable to provide an HMD or VR/AR headset that can be used with multiple types and sizes of mobile devices and can be produced and packaged small enough to be widely distributed as a promotional item.

SUMMARY OF THE INVENTION

An inflatable virtual reality (VR) or augmented reality (AR) headset system comprises one or more inflatable segments and one or more lenses. A first inflatable device segment cooperates with a mobile device and is attached to a second inflatable frame segment. The device segment comprises a skin or membrane that defines a first internal independent air chamber that can be inflated and deflated with a first valve. Additionally, the membrane of the device segment defines an external mobile device receptacle and an external display opening. The frame segment comprises a skin or membrane that defines a second internal independent air chamber that can be inflated and deflated with a second valve. Additionally, the membrane of the frame segment externally supports one or more lenses that are positioned to cooperate with the display opening of the display segment when the display segment and frame segment are both inflated. Preferably, the frame segment substantially but not completely surrounds the device segment. Additional optional features include a strap that attaches to the frame segment, clips or fasteners that attach to or are integral with the frame segment to facilitate attaching the inflatable VR headset to a user's headwear, and control and processing components and one or more housings defined by or attached to the frame or device segment for the control and processing components.

BRIEF DESCRIPTION OF THE DRAWINGS

FIG. 1 is a top view of the inflatable virtual reality headset system of the present invention when it is inflated.

FIG. 2 is a top view of the inflatable virtual reality headset system of the present invention when it is substantially deflated.

FIG. 3 is a front view of the inflatable virtual reality headset system of the present invention.

DETAILED DESCRIPTION OF THE INVENTION

Figure 4:
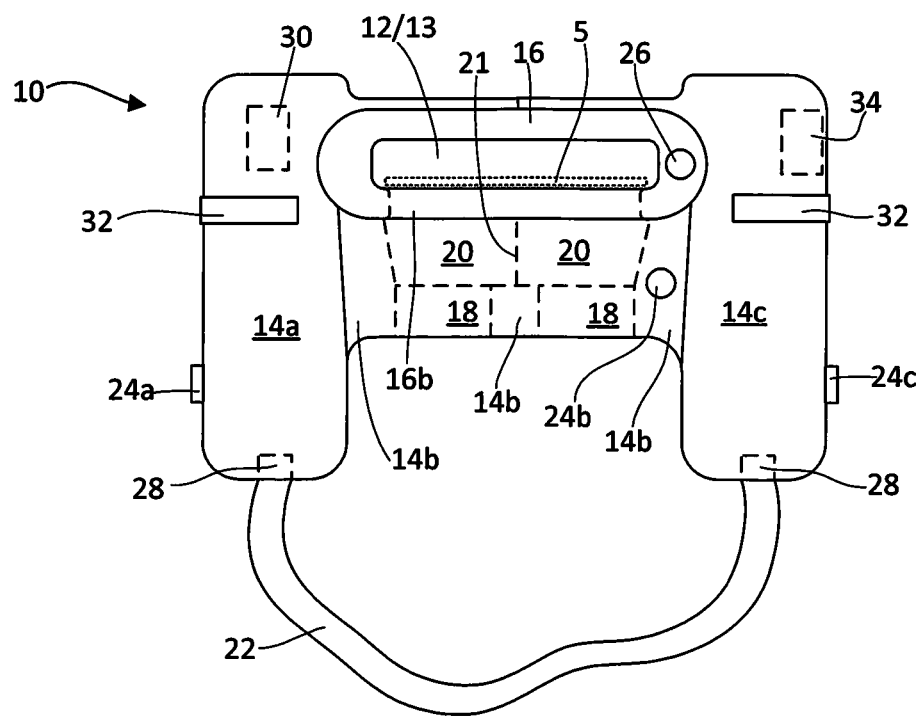
FIG. 4 is a top view of an alternate embodiment of the inflatable virtual reality headset system of the present invention when it is inflated.

An inflatable virtual reality (VR) or augmented reality (AR) headset system 10 comprises one or more inflatable segments and one or more lenses 18 as shown in FIGS. 1-3. Optionally, it further includes a dedicated display device 13, input/output devices 34, and control and processing components 30. Preferably, the headset system comprises at least two inflatable segments: a first inflatable device segment 16 that cooperates with a mobile device 12 or a dedicated display device 13 and a second inflatable frame segment 14 that is permanently or removably attached to the device segment 16. By using inflatable segments, the chambers can be inflated and deflated to customize fit and to accommodate a wide variety of mobile devices. Moreover, when deflated, the size and weight of the inflatable segments is greatly reduced and the size and weight of the overall headset system 10 is accordingly greatly reduced. Consequently, the cost of shipping the headset systems is reduced, and the headset systems can be packaged in a relatively small and convenient manner such that large volumes of the headset system can be easily transported, stored, and distributed.

The device segment 16 comprises a substantially continuous skin or membrane of a predetermined shape that defines a first inner, or internal, independent air chamber that can be inflated and deflated with a first valve 26 positioned on the membrane. The membrane can be a single membrane or several membranes connected together to form a substantially continuous membrane. Additionally, the outer, or external, surface of the membrane of device segment 16 preferably defines an external or outer mobile device receptacle 16a and an external or outer display opening 16b for cooperating with the display on a mobile device 12. Alternatively, the outer, or external, surface of membrane of device segment 16 defines a receptacle 16a and display opening 16b for cooperating with an attached and dedicated display device 13. The frame segment 14 likewise comprises a substantially continuous skin or membrane of predetermined shape that defines a second independent inner, or internal, air chamber that can be inflated and deflated with a second valve 24 positioned on the membrane. Additionally, the membrane of frame segment 14 defines an outer, or external, view opening 20 and supports one or more lenses 18 positioned along the outer surface of the membrane of frame segment 14 and positioned to cooperate with the view opening 20 and the display opening 16b when the display segment 16 and frame segment 14 are both inflated.

Preferably, the frame segment 14 substantially but not completely surrounds the device segment 16 as shown in the figures. Also preferably, frame segment 14, when inflated, is shaped and sized such that it blocks external light from entering the field of view of the user when it is positioned next to the user's face and in use. For example, frame segment can have extensions that extend along the sides of a user's face. The extensions can be formed as part of the frame segment 14 as shown in the figures or the extensions may comprises additional independent inflatable segments with cooperating independent valves so that they can be inflated or deflated separately and according to the user's unique preferences.

The outer surface of the skin or membrane of frame segment 14 preferably defines an external view opening 20 that is in fluid communication with the display opening 16b. The view opening is configured such that it provides a substantially unobstructed view of the display of a mobile device 12 when the mobile device is positioned in the inflated device segment and oriented so that its display is framed by and cooperates with the display opening 16b. Preferably and optionally, an additional membrane 21 that is integral with or attached to the frame segment 14 is positioned substantially centered within the view opening such that it acts a divider and prevents each eye from seeing content on the display that is intended for the other eye. Membrane 21 can further extend into display opening 16b or can cooperate with a similarly configured and positioned membrane in display opening 16b. FIG. 1 illustrates how the display opening 16b and view opening 20 cooperate. View opening 20 further cooperates with lenses 18 such that when a user looks through lenses 18 he also looks through view opening 20 and display opening 16b to see the display of the mobile device 12. Optionally, frame segment 14 can further be shaped and sized to create a nosepiece 14a when inflated as shown in FIG. 3. Also optionally, frame segment 14 can further be shaped to be whimsical or to represent characters, logos, or other design features.

Optionally, frame segment 14 can be divided into several separate air chambers each with their own inflation valve. FIG. 4 illustrates the frame segment having three air chamber sections 14a, 14b, and 14c and having three valves 24a, 24b, and 24c. While three air chamber sections are shown, any number of air chamber sections can be used depending on the desired shape and structure of the overall headset.

Preferably, the device segment 16, when inflated, is shaped and sized such that its outer surface surrounds and supports part of a mobile device 12 positioned in the receptacle 16a or a dedicated display 13 positioned in and attached to receptacle 16a. More preferably, the device segment 16, is further shaped and sized such that the display opening 16b cooperates with the display 5 of the mobile device 12 or dedicated display device 13 and allows a substantially unobstructed view of the display when device segment 16 is inflated. Because device segment 16 is inflatable, it can be inflated to greater or lesser amounts to accommodate mobile devices of different shapes and sizes. Additionally, when inflated, the air chamber of device segment 16 provides a protective cushion around mobile device 12 to prevent damage such as from dropping the headset system 12. Preferably, device segment 16 is further shaped and sized to create a seal or barrier that blocks external light from entering the field of view of the user when the headset system 10 is positioned next to the user's face and in use.

Both the device segment 16 and frame segment 14 include valves for inflating and deflating the segments as desired. Valves are generally known in the art and come in many varieties such as safety valves, jet valves, Boston valves, one-way valves, toy valves. Preferably, valves 24 and 26 are safety valves or jet valves.

Lenses 18 suitable for headset system 10 comprise acrylic, glass, or polymers and are preferably removably secured, or optionally permanently secured, to the outer surface of the membrane of frame segment 14. Lenses preferably attach externally to the membrane of frame segment 14 such that when frame segment 14 is inflated, the lenses are supported by the air chambers of frame segment 14 and positioned to cooperate with a user's eyes. Preferably, lenses comprise a collapsing, telescoping lens assembly with a push/pull focal adjustment. Collapsing, telescoping lenses are preferable in order to minimize packaging volume.

Optionally, a strap 22 can attach to the outer surface of frame segment 14 at attachment points 28. Attachment points 28 preferably are physical features slots through which a strap can be attached or snaps to which a strap can attach. Strap 22 preferably comprises adjustable strap material for securing the headset to the user's head by extending from one side of frame segment 14 around the back of the user's head to a second side of frame segment 14 as shown in FIG. 1. Strap material is well known in the art. Strap 22 also is preferably available in a variety of colors and patterns.

Optionally, clips or fasteners 32 can attach to or be integral with the outer surface of frame segment to facilitate attaching the inflatable VR headset 10 to a user's headwear. FIG. 1 illustrates optional clips positioned to cooperate with the bill of a baseball hat, for example. Other fasteners can be used as well, such as hook and loop fasteners and snaps. Additionally, headset system 10 may cooperate with other headwear as well such as visors, hoods, hats, scarves, goggles, and traditional glasses.

For some uses, control and processing components 30 may be needed to further enhance inflatable VR headset 10 and to facilitate cooperation with mobile device 12. Control and processing components 30 preferably are supported by frame segment 14 or device segment 16. For example, control and processing components may be attached to frame segment 14 directly, housed in a housing defined by frame segment 14, attached to device segment 16 directly, housed in a housing defined by device segment 16, or housed or attached to an additional segment (not shown in the figures) that is attached to or positioned near frame segment 14 or device segment 16. The additional segment optionally can be independently inflatable with a cooperating valve.

Control and processing components 30 preferably include a processor, memory, and wireless or wired communication components as is well known in the art. Wireless communications components include NFC components and longer range communications components to facilitate communication with the user's mobile device and to facilitate communication with software and content located remotely or accessible only via the Internet. Wired communication components include components configured to interact with a port or connection on the mobile device 12 so that there is a direct wired connection between the mobile device 12 and the control and processing components 30 in the headset. Additionally, software can be stored on the memory and executable by the processor to permit the user to communicate and interact with his mobile device while using the headset. Additional software can be stored on the memory and executable by the processor to facilitate displaying three dimensional content on the user's mobile device. Alternatively, mobile devices may store software as either content added after production of the mobile device or as part of the protected layer of firmware for the mobile device that can be remotely accessed by the control and processing components of the VR headset system 10 through the headset's NFC or other wireless communication methods or by direct connection or electrical communication between the mobile device 12 and headset system 10 such as with a USB connection.

Other additional features can be incorporated into frame segment 14 to accommodate accessories. For example, the outer surface of frame segment 14 can also define slots for inserting additional filters or screens or mirrors to alter the user's viewing experience. Additionally, openings, access ports, and buttons can be located at various locations around frame segment 14 to accommodate physical buttons, microphones, headphones, USB ports, communication components, computer and computing components, and other components that are either present on the mobile device or other cooperating devices.

Frame segment 14 and device segment 16 are preferably comprised of non-permeable, flexible material capable of securing the weight of the mobile device with which it cooperates when frame segment 14 and device segment 16 are partially or substantially inflated. For example, segments 14 and 16 may be comprised of rubber, latex, polychloroprene, or nylon. Frame segment 14 and device segment 16 can be a solid color or can incorporate designs, patterns, pictures, or logos. Preferably, at least portions of frame segment 14 and device segment 16 comprise opaque material to prevent light from entering the user's field of view during use. Preferably frame segment 14 and device segment 16 are available in a variety of colors, designs, and patterns to accommodate the specific tastes of the user or the advertising or promotional goals of the manufacturer, purchaser, or distributer. Frame segment 14 and device segment 16 are preferably permanently bonded together or attached together with, for example, adhesive. Additionally, frame segment 14 and device segment 16 may have integral membranes where attached. Alternatively, segments 14 and 16 can be removably attached with, for example, hook and loop fasteners.

Additional features and components can also be included with inflatable VR headset system 10 either as permanent features and components or as modular and removable features and components. For example, inflatable VR headset system 10 can further include input/output devices 34 such as a microphone, headphones, or both that physically attaches to frame segment 14 or device segment 16 and cooperates and communicates with mobile device 12, control and processing components 30, or both. Additionally, inflatable VR headset 10 may include motion detection sensors, optical sensors, head tracking technology and/or eye movement tracking technology. The additional features may be housed by or integral with segments 14 or 16, or they may be housed in or integral with additional segments that removably or permanently attach to either or both of frame segment 14 and device segment 16. The additional segments optionally can also be independent inflatable segments with cooperating independent valves.

To use the inflatable VR headset system 10 of the present invention with a mobile device 12, the user places his mobile device 12 into receptacle 16b and then inflates the frame segment 14 and device segment 16 by supplying a gas to the chambers through valves 24 and 26. To use the inflatable headset system 10 with a dedicated display device 13, the user simply inflates the frame segment 14 and device segment 16 by supplying a gas to the chambers through valves 24 and 26. For either use, segments 14 and 16 can be inflated with any type of gas, but preferably air or helium. Preferably, segments 14 and 16 are filled with gas supplied by the user by blowing into valves 24 and 26. Alternatively, the user can partially inflate or almost entirely inflate either or both of segments 14 and 16 prior to inserting his mobile device into receptacle 16b. Preferably, the user finishes inflating at least the device segment 16 after his mobile device 12 is placed appropriately so that device segment inflates enough to securely hold mobile device 12 in place and provide some cushioning. After segments 14 and 16 are inflated according to the user's preferences and such that the mobile device is securely held in device segment 16, the user places the headset system 10 so that he can look through lenses 18. Where there is a strap or headwear fasteners, the user can then secure the headset system either to his head or to his headwear with the strap or fasteners, respectively. Once the headset system is placed appropriately, the user can enjoy virtual reality content on his mobile device by looking through lenses 18.

While there has been illustrated and described what is at present considered to be the preferred embodiment of the present invention, it will be understood by those skilled in the art that various changes and modifications may be made and equivalents may be substituted for elements thereof without departing from the true scope of the invention disclosed, but that the invention will include all embodiments falling within the scope of the claims.

We claim:

1. A headset system useful for viewing a display comprising:
  a. a first inflatable segment comprising a first membrane having an inner surface and an outer surface and a first valve attached to the first membrane, wherein the inner surface of the first membrane defines an air chamber that can be inflated or deflated with the first valve;
  b. a second inflatable segment attached to the first inflatable segment comprising a second membrane having an inner surface and an outer surface and a second valve attached to the second membrane, wherein the inner surface of the second membrane defines an air chamber that can be inflated or deflated with the second valve;
  c. one or more lenses supported by the second inflatable segment;
  d. a display opening defined by the outer surface of the first membrane of the first inflatable segment, wherein the display opening is configured to cooperate with a device display and positioned such that it can be viewed through the lenses when the first inflatable segment is at least partially inflated;
  e. a view opening defined by the outer surface of the second membrane of the second inflatable segment, wherein the view opening aligns with display opening of the first inflatable segment such that it is in fluid communication with the display opening of the first inflatable segment; and f. a divider attached to the outer surface of the second membrane and positioned in the view opening.

2. The headset of claim 1 wherein the cooperating device display comprises a dedicated device comprising a display and wherein the dedicated device attaches to the first inflatable segment such that its display aligns with the display opening.

3. The headset of claim 1 wherein the cooperating device display comprises a mobile device comprising a display and wherein the headset further comprises a device receptacle defined by the outer surface of the first membrane of the first inflatable segment, wherein the device receptacle is configured to cooperate with the mobile device such that the mobile device display aligns with the display opening when the mobile device is placed in the device receptacle.

4. The headset of claim 1 further comprising control and processing components supported by at least one of the inflatable segments and configured to communicate with the cooperating display and device.

5. The headset of claim 1 further comprising a strap attached to at least one of the inflatable segments.

6. The headset of claim 5 wherein the strap attaches to the second inflatable segment.

7. The headset of claim 1 further comprising one or more fasteners attached to at least one of the inflatable segments.

8. The headset of claim 7 wherein the fasteners attach to the second inflatable segment.

9. The headset of claim 1 wherein the second inflatable segment defines a nose piece when at least partially inflated.

10. The headset of claim 1 wherein the second inflatable segment comprises a plurality of attached air chambers, wherein each air chamber comprises a membrane having an outer surface and an inner surface and a valve attached to the membrane, wherein each air chamber can be inflated or deflated with its corresponding valve.

* * * * *